United States Patent [19]
Pillet

[11] 3,887,669

[45] June 3, 1975

[54] METHOD FOR FORMING A COMPOSITE OBJECT OF ACRYLIC RESIN AND SILICONE ELASTOMER

[75] Inventor: Jean Pillet, Paris, France

[73] Assignee: Rhone-Poulenc, S.A., Paris, France

[22] Filed: Mar. 26, 1973

[21] Appl. No.: 345,066

[30] Foreign Application Priority Data
Mar. 28, 1972  France .............................. 72.10821

[52] U.S. Cl. .................. 264/16; 156/306; 161/208; 260/46.5 UA; 260/46.5 G; 264/36; 264/256
[51] Int. Cl. ............................................ A61c 13/00
[58] Field of Search ................ 264/16, 17, 255-256; 161/208; 156/306

[56] References Cited
UNITED STATES PATENTS
3,251,910  5/1966  Barnhart ............................... 264/17
3,258,509  6/1966  Barnhart ............................... 264/17
3,288,893  11/1966  Stebleton ............................. 264/17

*Primary Examiner*—Robert F. White
*Assistant Examiner*—Gene Auville
*Attorney, Agent, or Firm*—Stevens, Davis, Miller & Mosher

[57] ABSTRACT

Composite articles of an acrylic resin adhering to an elastomeric polydiorganosiloxane are obtained by bringing together a curable acrylic composition hot curable in the presence of a peroxide and a curable polydiorganosiloxane hot curable in the presence of a peroxide, and heating the assembly when a strong bond is formed between the two materials. No other adhesive is required. The procedure is especially useful in making dental prostheses.

5 Claims, No Drawings

METHOD FOR FORMING A COMPOSITE OBJECT OF ACRYLIC RESIN AND SILICONE ELASTOMER

The present invention relates to acrylic resin/silicone elastomer composite objects and to a process for manufacturing them.

Amongst composite objects of this type, the best known are devices for dental prostheses comprising a support for teeth made of acrylic resin and a base made of silicon elastomer. While the detail of the present invention is described below in relation to dental prostheses, it will be appreciated that similar principles can be adopted for the application of the invention for other purposes.

Means have been sought for a long time for combining rigid supports for teeth, generally made of acrylic resins, with elastomeric materials which will soften the contact between the prostheses and the gums. Although silicones are the most valuable elastomeric materials for this purpose, it has not been possible to use them in practice because of their inability to be joined firmly onto the acrylic support. The various techniques proposed hitherto do not seem to have been developed to any extent. It was proposed to use mechanical anchoring which may be either partial (French patent specification No. 1,392,594) or total, that is to say, a fine particle covering of the rigid material with the elastic material (as in French patent specification No. 1,439,545). Another technique makes use of an adhesive layer (primer), produced from a vinyl derivative of alkoxy- or acyloxy-silane, deposited on the non-vulcanised methacrylate, and to which a silicone elastomer which can be vulcanised at ambient temperature is applied, (see French patent specification Nos. 1,416,264 and 1,416,265).

The present invention makes it possible to obtain directly a silicone elastomer/acrylic resin bond, and more especially, makes it possible to produce, in a single operation, a composite silicone elastomer/acrylic resin article without the prior application of an adhesive layer. The invention also makes use of materials which are stable at ambient temperature i.e. 15–25°C and thus can be stored without undue precautions.

The present invention provides a process of producing a solid composite object comprising an acrylic resin portion adhering to a silicone elastomer portion, the method comprising bringing into contact with one another a first mixture comprising a peroxide catalyst and an acrylic composition which can be hot cured in the presence of a peroxide catalyst and a second mixture comprising a peroxide catalyst and vulcanisable polydiorganosiloxane rubber with a chain which consists of 85 to 99.95% of $(CH_3)_2SiO$ units, 0 to 10% of $(C_6H_5)_2SiO$ units and 5 to 0.05% of $CH_3(CH_2\!=\!CH)SiO$ units and is blocked at each end by a $(CH_3)_3SiO_{0.5}$ or $(CH_3)_2(CH_2\!=\!CH)SiO_{0.5}$ unit and then heating the first mixture and second mixture in contact with one another until a solid object is produced.

The invention also includes products, particularly dental prostheses, obtained by the process of the invention.

The acrylic composition used in the invention can be any one of those customarily used in the dental art, such compositions, heat curable to an acrylic resin in the presence of a peroxide are well known in the dental art. The polymerisable acrylic compound is usually one containing a

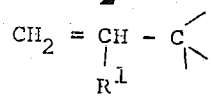

residue where $R^1$ is H or methyl, and can be acrylic or methacrylic acid or its derivatives such as esters e.g. methyl methacrylate, nitriles etc.

Rubbers which can be used in the invention include, by way of example:

a. a polydiorganosiloxane rubber containing 94.6% of $(CH_3)_2SiO$, 5.3% of $(C_6H_5)_2SiO$ units and 0.1% of $(CH_3)(CH_2\!=\!CH)SiO$ units, terminated at each chain end by a $(CH_3)_3SiO_{0.5}$ unit and of viscosity $15 \times 10^6$ cPo at 25°C, b. a mixture of 51.5 parts by weight of a polydiorganosiloxane rubber containing 98.6% of $(CH_3)_2SiO$ units and 1.4% of $(CH_3)(CH_2\!=\!CH)SiO$ units, terminated at each chain end by a $(CH_3)_2(CH_2\!=\!CH)SiO_{0.5}$ unit and of viscosity $10^7$ cPo at 25°C and 55.4 parts by weight of a dimethylpolysiloxane rubber terminated at each chain end by a $(CH_3)_3SiO_{0.5}$ unit and of viscosity $2 \times 10^7$ cPo at 25°C.

The adhesion of the first and second mixtures to one another is achieved during a single heating operation, e.g. at 100–150°C. which makes it possible to cure both the resin and the elastomer.

The invention makes it possible to produce directly composite objects such as dentures with an elastic base or parts of external or internal prostheses.

Of course, the invention can be used to produce composite objects from at least one component which has already been cured, provided that at least one of the curable products i.e. the first or second mixture, is used as the adhesive layer.

For example, an elastic base can be fitted to an existing dental prosthesis. The portion of resin to be replaced is removed on a grinding wheel, a thin layer of the curable acrylic composition is applied to the joining surface and then a mass of the elastomer referred to above is pressed directly onto this layer in a mould and the whole assembly is heated at the usual temperature and for the usual time.

The invention is particularly valuable for manufacturing small parts for which the requirements are irregular, as is generally the case for various prosthetic devices which must be fitted individually and which, because of this, cannot be manufactured in large numbers. It is then practical to have available, for example, a composition for the elastomer which remains stable under cold conditions, even in the presence of moisture, but which can be crosslinked rapidly under the same conditions as the acrylic resin which is usually employed.

The following Example is given to illustrate the invention.

EXAMPLE

The following are used to manufacture a dental prosthesis with a flexible base:

A commercially available acrylic composition for dental prosthesis which is a suspension of a powdered methyl methacrylate polymer in a methyl methacrylate monomer syrup, with a small amount of benzoyl peroxide, and an organosilicon composition comprising, by weight:

78% of a dimethylpolysiloxane rubber, the chain of which contains 0.20% of $CH_3(CH_2=CH)SiO$ units and of viscosity $25 \times 10^6$ cPo at 25°C, 19.95% of pyrogenic silica, 0.4% of an α-ω-dihydroxypolydimethylsiloxane oil (containing 13% by weight of —OH groups), 0.4% of tetramethylenedioxydimethylsilane and 1.25% of a 50% w/v dispersion of 2,4-dichlorobenzoyl peroxide in a polydimethylsiloxane oil.

This composition has the consistency of the paste and can be shaped.

The first step is to pack the mould with the acrylic composition and to press it right down, as for a normal prosthesis. The mould is then opened and a layer of the acrylic composition removed which corresponds to the elastomeric layer to be introduced. Since the acrylic composition is uncured, this operation can be carried out easily with a spatula. After coating the joining surface with acrylic monomer, a slight excess of the silicone composition is placed in position and the whole assembly is pressed right down again by closing the mould. After checking the quality of impression, the whole assembly is cured in the closed mould under the usual conditions, either in boiling water (about 10 hours) or in an oven at 130–140°C (2 to 3 hours). The shaped object is then removed from the mould and the finishing treatments are carried out in accordance with the usual techniques.

We claim:

1. In a process of producing a solid composite object comprising an acrylic resin portion adhering to a silicone elastomer portion, the improvement comprising bringing into direct contact with one another and without an intervening priming layer a first mixture comprising a peroxide catalyst and a methyl methacrylate composition which can be hot cured in the presence of a peroxide catalyst and a second mixture comprising a peroxide catalyst and vulcanisable polydiorganosiloxane rubber with a chain which consists of 85 to 99.95% of $(CH_3)_2SiO$ units, 0 to 10% of $(C_6H_5)_2SiO$ units and 5 to 0.05% of $CH_3(CH_2=CH)SiO$ units and is blocked at each end by a $(CH_3)_3SiO_{0.5}$ or $(CH_3)_2(CH_2=CH)SiO_{0.5}$ unit and then heating the first mixture and second mixture in direct contact with one another until a solid object is produced.

2. A process according to claim 1 wherein at least one of the first mixture and second mixture is directly supported on a component comprising cured first mixture or cured second mixture respectively.

3. A process according to claim 2 wherein the first mixture is directly supported on the bonding surface of a cured methyl methacrylate resin article, the second mixture is then brought into contact with the first mixture and the whole assembly heated.

4. A method according to claim 3 wherein a layer is removed from that part of a methyl methacrylate resin denture plate designed to contact the roof of the mouth in an amount corresponding substantially to the amount of elastomeric material to be bonded to the plate to reveal a bonding surface, a layer of the first mixture is applied to the bonding surface, a layer of the second mixture is applied in direct contact with the layer of first mixture and the assembly is then heated.

5. A process according to claim 1 wherein the first mixture is moulded into the shape of a dental prosthesis, a portion of the first mixture, corresponding to the amount of elastomeric material to be bonded to the prosthesis, is removed, an amount of the second mixture is brought into direct contact with the moulded first mixture and the whole assembly remoulded to the shape of the dental prosthesis, and the assembly then heated.

* * * * *